United States Patent [19]

Eastmond

[11] 4,037,158
[45] July 19, 1977

[54] TWO-WAY FM RADIO SYSTEM OPERATING ON A SINGLE CHANNEL AND PROVIDING SIMULATED DUPLEX OPERATION

[75] Inventor: Bruce Charles Eastmond, Downers Grove, Ill.

[73] Assignee: Motorola, Inc., Schaumburg, Ill.

[21] Appl. No.: 672,359

[22] Filed: Mar. 31, 1976

Related U.S. Application Data

[63] Continuation of Ser. No. 512,749, Oct. 7, 1974, abandoned.

[51] Int. Cl.² .......................... H04B 1/44; H04B 1/54
[52] U.S. Cl. .................................. 325/22; 178/58 R; 325/57; 343/178
[58] Field of Search ...................... 325/21, 22, 52, 57; 343/175, 178-180; 178/58 R

[56] References Cited

U.S. PATENT DOCUMENTS

| 2,435,010 | 1/1948 | Knapp et al. | 325/22 |
| 2,501,986 | 3/1950 | Brockman | 325/57 |

Primary Examiner—Robert L. Griffin
Assistant Examiner—Marc E. Bookbinder
Attorney, Agent, or Firm—James W. Gillman; Victor Myer; James P. Hamley

[57] ABSTRACT

A two-way FM radio transmitter-receiver operates on a single channel and automatically samples the channel during transmissions to sense the presence of a carrier wave. The transmitter is actuated by use of a transmit key which starts timing means to produce a time interval, and at the end of the time interval a sample generator is actuated for a very short time period to turn off the transmitter, disconnect the antenna from the transmitter, and connect the antenna to the receiver. A detector coupled to the squelch circuit of the receiver at the transmitting station detects the presence of a carrier wave on the channel, and the detector output produced in response to a carrier wave acts to hold the transmitter off and allow the receiver to reproduce the received wave. When the transmitter is turned off for the short time period, the absence of the carrier will cause the FM receiver at the receiving station to produce a burst of noise. This results in an output from the squelch detector which is utilized to blank the audio output by initiating action of the timing means to produce the first and second time intervals followed by a blanking period. The time interval produced by the timing means, and the blanking period, can be somewhat longer than the time interval and the sampling period used during transmissions. By changing the duration thereof, the same monostables are used to provide the blanking action during reception as are used to provide the sampling action during transmission.

12 Claims, 3 Drawing Figures

TWO-WAY FM RADIO SYSTEM OPERATING ON A SINGLE CHANNEL AND PROVIDING SIMULATED DUPLEX OPERATION

BACKGROUND OF THE INVENTION

This is a continuation application of my previous application U.S. Ser. No. 512,749, filed Oct. 7, 1974, now abandoned and assigned to the same assignee as the instant application.

Two-way radio systems operate either in the duplex mode in which communications in the two directions can take place simultaneously on two different frequencies, or can include a control whereby transmission takes place in only one direction at a time and a single frequency is used. In the latter case, it is common practice to provide push-to-talk operation whereby it is necessary for an operator to actuate a switch when he desires to transmit. To eliminate the need for a manual operation, voice operated switches have been used to automatically turn on the transmitter when a transmission is started. For such operation, the receiver at the transmitting station is disabled and it is therefore not possible for the receiving station to break in and send a message to the transmitting station in the event it might desire to do so. This may be an important problem in many applications in which two-way radio is used, such as in police work, as an emergency may arise wherein it is very important that either party can send a message to the other party at any time.

The above problem is eliminated by the use of duplex operation, but this requires two channels, which may not be available. In addition to the requirement of two channels, full duplex systems require a diplexer to permit connection of the transmitter and receiver at each station to the same antenna for radiating signals which are transmitted and for receiving signals which are received. The diplexer prevents the application of signals from the transmitter to the receiver and the application of received signals to the transmitter. Diplexers which are known include frequency selective elements which are relatively bulky and are not suitable for use in extremely small radio equipment, such as portable radio equipment. Further, the diplexer may increase the cost of the radio equipment to an objectionable extent.

Some prior art systems employ single channel operation whereby one party may "break-in" to the transmission of another. In these systems the transmitter is periodically and momentarily deactivated allowing the receiver to sense for the presence of a break-in transmission. If no remote transmission is detected control is returned to the transmitter. However, on reception of a break-in carrier the transmitter is locked out for the duration of break-in in carrier presence.

Several problems with the prior art emergency break-in type systems make them unsuitable of single channel simulated duplex operation. First, once break-in is accomplished the prior transmitting station is completely locked out from further transmission until the intervenor relinquishes control. Also, should the break-in signal fade or encounter intermittent operation, the various transmitters attempting to control the channel may result in a "see-saw" oscillation whereby communication will cease and confusion will result.

In addition, the high repetition rate of transmitter cycling in the prior art systems produces excessive adjacent channel splatter which renders such systems unuseable for all but broad bandwidth applications.

Further, and especially true in FM applications, a receiver tuned to a remotely located intermittently switching transmitter will produce noise bursts during the cycling period. These bursts can be quite annoying to the operator and result in lost communication.

SUMMARY OF THE INVENTION

It is an object of the present invention to provide an improved two-way radio system wherein communication in both directions takes place on a single channel and wherein each station can break-in during a transmission from the other station to provide simulated duplex operation.

Another object of the invention is to provide a two-way radio system which operates on a single channel, wherein the transmitter is automatically turned off and the receiver is connected to detect the presence of a carrier wave on the channel during short intervals which do not substantially degrade the transmission, and wherein the receiver is held connected in the event that a carrier wave is detected.

A further object of the invention is to provide two-way radio system including at the transmitting and receiving stations a transmitter and receiver and a control system therefor, wherein the control system includes a timer which automatically turns off the transmitter at the transmitting station for short intervals to sample the channel to detect the presence of a carrier wave, and wherein the timer at the receiving station is also used to blank the audio output of the receiver to remove noise bursts produced by this receiver when the transmitter at the transmitting station is turned off.

It is a further object of the invention to provide a two-way communication system as described above which provides a means for latching a station to the receive mode upon detection of a carrier wave, and which provides a further means to override the latching means whereby a break-in transmission may be effected.

In practicing the invention a two-way FM radio transmitter and receiver are connected to an antenna for communicating in two directions on the same channel or frequency. A transmit key is provided, which may be a push-to-talk switch or a voice operated relay, which turns on the transmitter when it is desired to initiate a transmission and which simultaneously initiates the operation of timing apparatus. The timing apparatus controls the interruption of the transmission for sampling the channel and includes a first delay generator for providing an interval between samples, a second delay generator for providing a very short adjustable time interval and a sample generator which produces a pulse to turn off the transmitter and connect the receiver to the antenna to provide the sampling operation. The sampling periods (pulses) are quite short and occur at relatively long intervals, so that the interruption of the transmitter does not substantially degrade the transmission. The radio will commonly be used with another similar radio at the receiving station which can also interrupt the transmitter to sample the channel, and when this takes place a noise burst is produced by the receiver at the receiving station. The same timing apparatus is used to blank the receiver during this noise burst as to provide the sampling periods for interrupting the transmission. For such operation, the first delay generator provides the same time interval and the second delay generator is adjusted to provide a slightly longer time interval than for the transmitter sampling action. The sampling generator now operates as a blanking generator and is adjusted to provide a somewhat longer blanking period (pulse) to take care of component tolerances. The control system includes logic elements for controlling the operation of the transmitter, receiver, and audio output in response to operation of the transmit key and the action of the timing apparatus.

DETAILED DESCRIPTION

Figure 1:
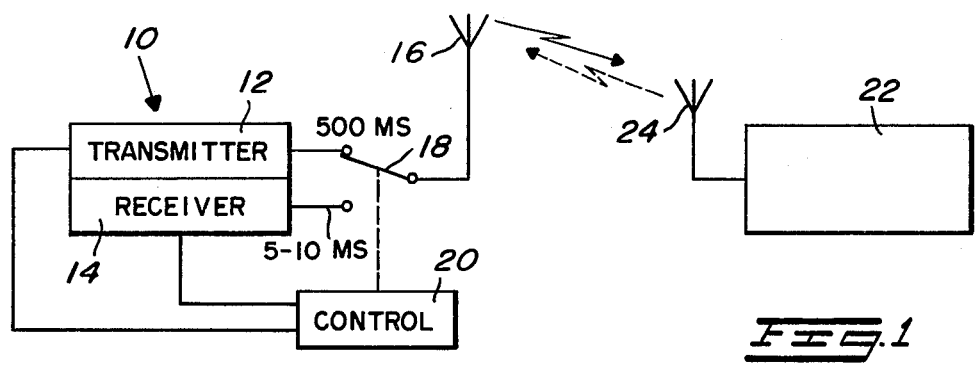
FIG. 1 is a block diagram illustrating generally the system of the invention.

In FIG. 1 there is illustrated in block diagram form the general system of the invention. The two-way radio 10 includes a transmitter 12 and a receiver 14. The transmitter and receiver are connected to an antenna 16 by switch 18, which is operated by control unit 20 which is coupled to the transmitter 12 and to the receiver 14. The radio 10 communicates with a second radio 22 which has an antenna 24. The radio 22 may be identical to the radio 10 and may be connected to the antenna by a switch operated by a control unit, such as 18 and 20, respectively. As will be further explained, the control unit 20 controls the switch 18 so that during transmissions the antenna 16 will be connected to the receiver 14 for a period of from 5 to 10 milliseconds every 500 milliseconds.

Figure 2:
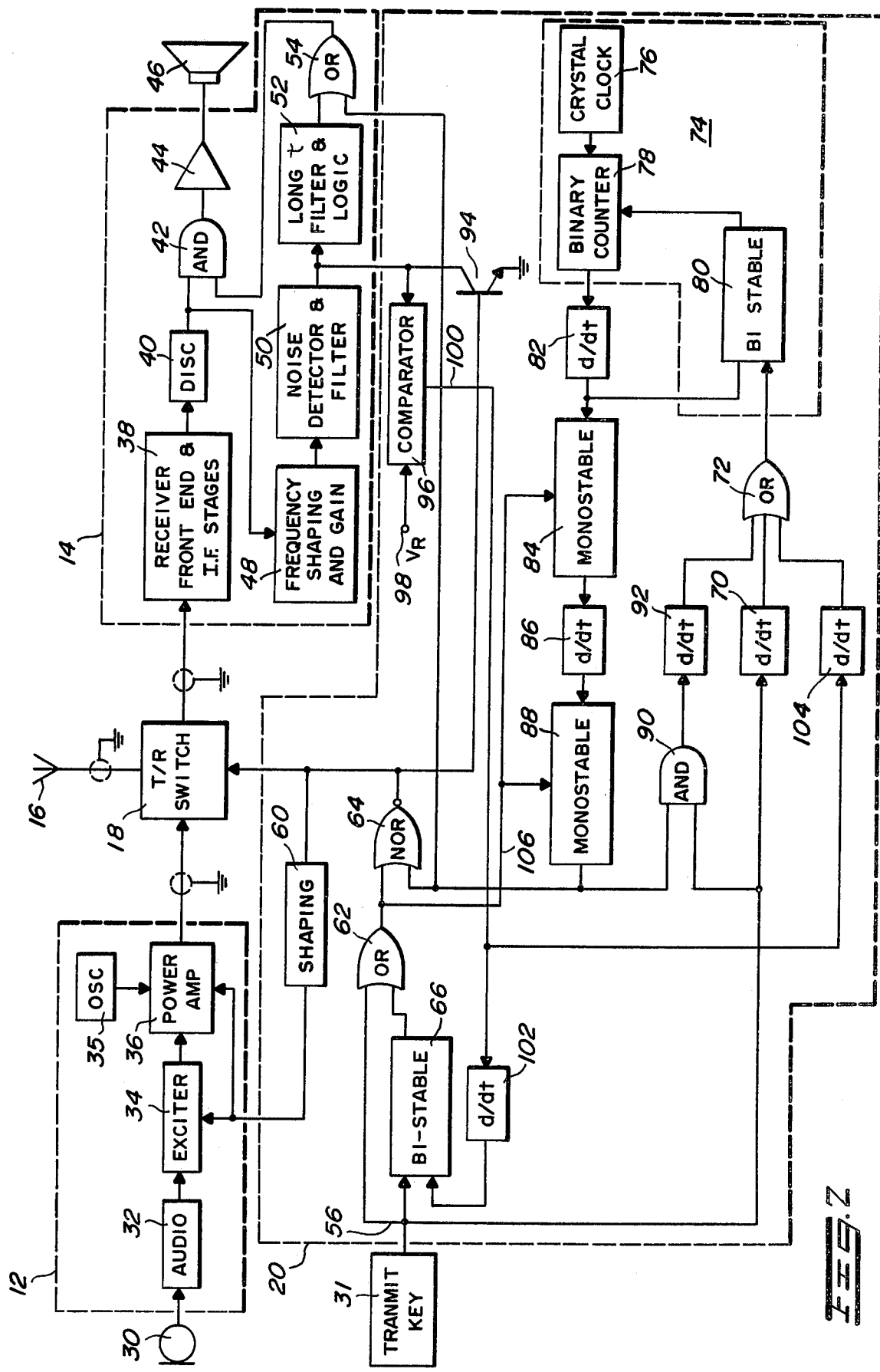
FIG. 2 is a detailed block diagram of the transmitter, receiver and control system of FIG. 1.

FIG. 2 is a detailed block diagram showing the transmitter 12, receiver 14 and the control unit 20 of FIG. 1. A microphone 30 is coupled to the transmitter 12, which transmitter includes an audio section 32, exciter 34, oscillator 35 and power amplifier 36. These elements can be of known construction as commonly used in an FM transmitter. The output of the power amplifier 36 is connected to the transmit/receive switch 18 for application to the antenna 16. The receiver 14 includes a front end 38 which may include frequency converter, IF amplifier and limiter stages, as normally provided in an FM receiver. The intermediate frequency signal is applied to discriminator 40 which converts the FM carrier wave to an audio signal, and this is applied through AND gate 42 and amplifier 44 to a loudspeaker 46, or other audio reproducing device. A squelch circuit is connected to the output of discriminator 40 and includes one or more frequency selective amplifier stages 48 which apply a signal to the noise detector 50. The output of the detector 50 is applied through filter 52 to OR gate 54, which has its output connected to a second input of AND gate 42 to control the application of the audio signal therethrough.

Connected to the input of the control circuit 20 is a transmit key 31. This can be a push-to-talk switch as is commonly used with a microphone, and the key 31 and microphone 30 may be provided as a single unit. Alternatively the transmit key may be a voice operated relay which receives the audio from amplifier 32 of the transmitter, and operates in response to an audio signal having predetermined characteristics. In either case the transmit key can be of known construction.

The transmit key 31 is connected to conductor 56 in the control unit 20 which is connected to one input of OR gate 62. The output of OR gate 62 is connected to one input of NOR gate 64, the output of which is connected to the T/R switch 18 and to the shaping circuit 60 which controls the energization of the exciter 34 and the power amplifier 36.

In the normal receiving condition when the key 31 is not operated, a high level voltage or 1 is applied to conductor 56 so that the output of the OR gate 62 is also a high level or 1 voltage. This will cause the NOR gate 64 to produce a low level or 0 voltage output. This voltage causes the T/R switch 18 to be in the receiving position connecting the antenna 16 to the receiver 14, and the exciter 34 and power amplifier 36 of the transmitter 12 to be de-energized.

When the transmit key 31 is operated, the voltage on conductor 56 falls to a 0 to provide a 0 at the output of OR gate 62, and a high voltage or 1 at the output of NOR gate 64. The 1 at the output of the NOR gate 64 applied to the shaping circuit 60 causes the exciter 34 and the power amplifier 36 of the transmitter 12 to be energized so that a carrier wave is applied to the switch 18. The high voltage or 1 applied to the switch 18 causes this switch to operate to connect the antenna 16 to the output of power amplifier 36, so that the carrier wave produced by the transmitter is radiated.

The transmit key 31 is also connected by conductor 56 to bistable circuit 66 which has an output connected to the second input or OR gate 62. The operation of circuit 66 will be described at a later point in the specification.

The signal on conductor 56 from the transmit key 31 is also applied through a differentiating circuit 70 to the three input OR gate 72. When the signal level on conductor 56 falls in response to operation of the key 31, the circuit 70 provides a pulse which is applied through OR gate 72 to delay generator 74. The generator 74 includes a crystal clock 76, the output pulses of which are applied to binary counter 78. The binary counter 78 is rendered operative to start counting by bistable circuit 80 to which the pulse from OR gate 72 is applied. The output of the binary counter 78 is applied to differentiating circuit 82 which produces a pulse at the end of the count, which is applied to the second or stop input of the bistable 80. This causes the binary counter 78 to stop counting and resets the same for the next delay interval.

The output pulse from the differentiating circuit 82 is also applied to delay generator 84, which may be provided by a monostable multivibrator. The monostable 84 is coupled to the differentiating circuit 86, and at the end of the period of the monostable, the circuit 86 applies a pulse to trigger the sample generator 88, which may also be a monostable multivibrator. The output of the sample generator 88 is applied to a second input of the NOR gate 64 and also to AND gate 90.

AND gate 90 has a second input connected to conductor 56, so that AND gate 90 will produce an output when the transmit key 31 is operated and the sample generator 88 produces an output. The output of AND gate 90 is applied to differentiating circuit 92 which provides a pulse at the end of the pulse produced by the sample generator 88. This is applied through a second input of the OR gate 72 to the bistable circuit 80 to again start the operation of the delay generator 74. Operation of the delay generator 74 will again start the sequence which includes the operation of the delay generator 84 at the end of the delay produced by the generator 74, followed by operation of the sample generator 88 at the end of the delay produced by delay generator 84. At the end of the period of the sample generator 88, the output thereof again triggers the delay generator 74 if the transmit key 31 is still held operated, so that this period is again produced and the periods are repeated to provide recurring sampling pulses from the sample generator monostable 88.

Figure 3:
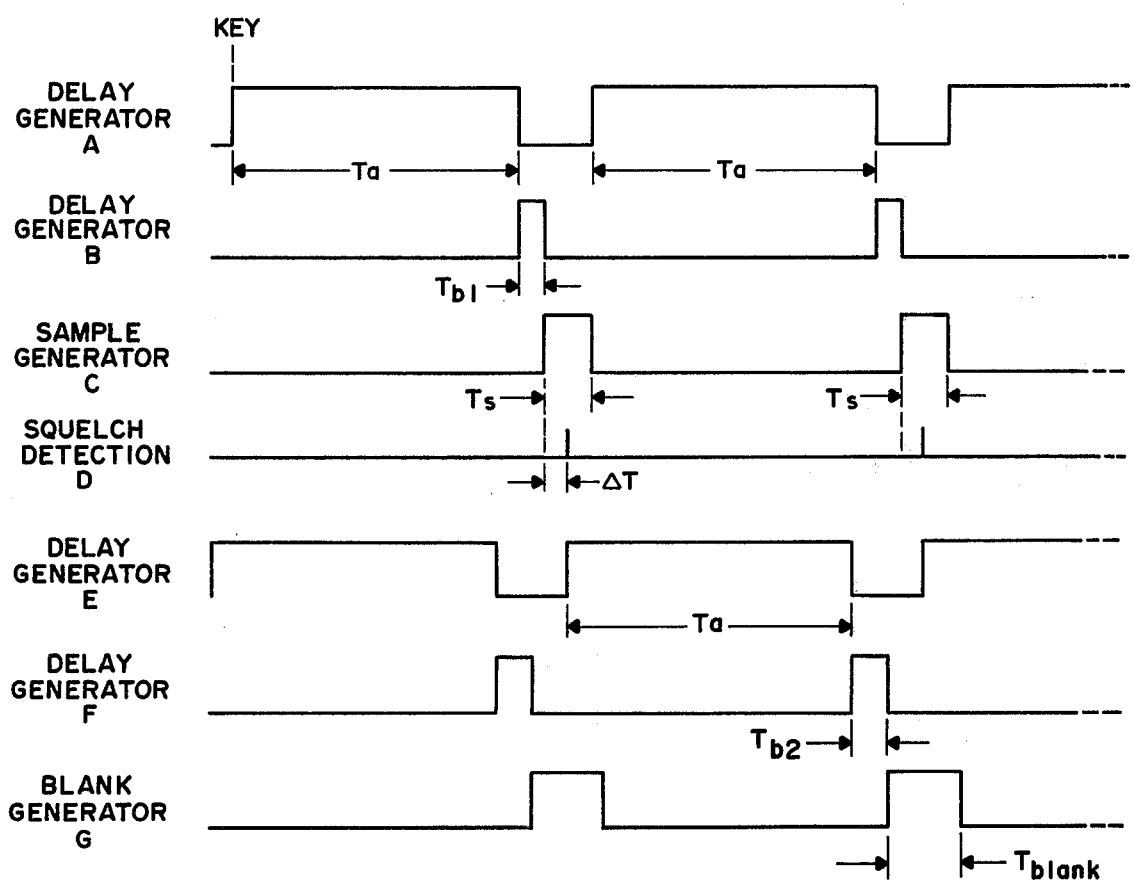
FIG. 3 is a timing diagram illustrating the operation of the system of FIG. 2.

The sequence of operations just described is illustrated in FIG. 3 wherein line A shows the operation of delay generator 74. As indicated, when the key 31 is operated, the first timing period will be produced which is indicated as the period $T_a$. At the end of the period $T_a$, the delay generator 84 is operated to produce the output as shown in line B of FIG. 3. This is a short pulse having a duration indicated as time $T_{b1}$. Line C of FIG. 3 shows the output of the sample generator 88, which is a pulse starting at the end of the pulse from delay generator 84 and having a duration indicated by the time period $T_s$, which represents the sampling period.

The delay generator 74 may provide a 500 millisecond (one-half second) time base $T_a$. The crystal clock can operate at 65,536 Hertz and the binary counter 78 is set to provide an output when the count reaches a number corresponding to slightly less than 500 milliseconds. The delay generator 84 will provide a further delay which is utilized to change the total delay to synchronize the squelch control, as will be explained. This is a relatively short time period, which may be only a few milliseconds so that the total delay is about 500 milliseconds. The sampling period $T_s$ provided by the sample generator 88 may be a period of 5 milliseconds or slightly more. It may be desired to increase this to 8 milliseconds, or to a maximum of 10 milliseconds, to provide adequate time for the system to respond to a received carrier wave.

During the sampling period, the voltage pulse from the sample generator 88 applied to the NOR gate 64 causes the output thereof to drop to a 0. This actuates the switch 18 and the voltage applied to the shaping circuit 60 acts to turn off the transmitter exciter 34 and power amplifier 36. The shaping circuit 60 controls the rate of turn-on and turn-off of the exciter 34 and power amplifier 36, to eliminate or substantially reduce adjacent channel splatter. The transmit receiver switch 18 momentarily connects the antenna 16 to the receiver 14, and disconnects the antenna from the transmitter 12, as has been described.

The output from the NOR gate 64 is also applied to the transistor clamp switch 94 to render this transistor nonconducting and remove this clamp so that the output of the noise detector 50 is applied to the comparator circuit 96. A reference voltage 98 is applied to this comparator circuit 96, and when the output of the noise detector exceeds the reference voltage, an output will be produced by the comparator circuit 96. This output is applied on conductor 100 connected to the differentiating circuit 102, which applies a pulse to the second input of the bistable circuit 66.

If a carrier wave is present on the channel at the time that the NOR gate 64 produces an output which operates the transmit/receive switch 18 to connect the antenna 16 to the receiver, the noise detector 50 of the receiver 14 will provide an output which exceeds the reference 98, and the comparator 96 will produce an output to differentiator 102 to set the bistable 66. The bistable 66 then produces a high level or 1 output which is applied to the OR gate 62 to provide a 1 output to effectively override the transmit key 31 voltage applied on conductor 56. The OR gate 62 will then apply the 1 output to NOR gate 64, so that the NOR gate 64 will provide a 0 output. This holds the transmitter off and the transmit/receive switch 18 in condition to apply the received wave from the antenna 16 to the receiver 14. Accordingly, the system is held in the receiving condition.

The received carrier will break in on the transmission, even though the transmit key may still be operated. This is desired as the radio operator will require some time to react to the break-in signal. The operator will normally release the push-to-talk switch, or stop talking to release the voice operated switch, in response to the break-in signal. This will reset the bistable circuit 66, so that if the transmit key 31 is again operated, the bistable circuit 66 will again condition the system for transmission. If the station with which the radio is communicating also has a break-in facility, such as has been described, this station can respond to the transmitted carrier to terminate the break-in operation.

When the radio equipment as shown in FIG. 2 is used at the receiving station receiving a signal coming from a transmitting station which is equipped to sample channel activity and providing break-in, as has been described, at the time the transmitter of the transmitting station turns off for sampling the channel, a burst of noise will be produced by the receiver at the receiving station. This noise is very objectionable and the control circuit 20 is effective to remove the same. The burst of noise will cause the squelch detector 50 of the receiver to provide an output which drops below the reference voltage 98. The comparator 96 will provide a reduced output on conductor 100 which is applied to differentiating circuit 104 to apply a pulse to the third input of OR gate 72. This will start the delay generator 74 and initiate the timing sequence of the operation of the delay generator 74, the delay generator 84 and the sample generator 88, as has been described.

Since the transmit key 31 has not been operated, the voltage on line 56 applied to the input of OR gate 62 will be high and the output of OR gate 62 will be high. This is applied on conductor 106 which is connected to the monostable circuits 84 and 88 which form the second delay generator and the sample generator. This is utilized to cause the periods of the monostable multivibrators forming these generators to increase somewhat during receiver operation. This increases the total delay ($T_a + T_{b2}$), which is required because the delay period at the receiver starts before the sampling period at the transmitter ends. This also provides a blanking period $T_{blank}$ which is somewhat longer than the sampling period used during transmitter operation to take care of timing variations resulting from component tolerances.

The squelch blanking operation which has been described is illustrated by the chart of FIG. 3. When the sampling generator at the transmitting station turns off the transmitter (line C), the noise burst will be produced at the receiver of the receiving station which is detected at time Δ T, as shown in line D of FIG. 3. At the time the squelch detector output reduces, the comparator 96 will apply a reduced output on conductor 100 and differentiator 104 will provide a pulse to start the delay generator 74. This is shown by the waveform on line E of FIG. 3. As previously described, the delay generator 84 will operate at the end of the delay produced by generator 74, and this provides a delay $T_{b2}$ which is shown by line F in FIG. 3. This delay is somewhat longer than the delay $T_{b1}$ produced during transmission. At the end of the period $T_{b2}$, the monostable 88, which now functions as a blanking generator, will be operated. This produces a blanking period $T_{blank}$ as shown in line G of FIG. 3. This occurs during the sampling periods of the transmitter at the transmitting station, which are shown by line C of FIG. 3.

The system which has been described permits operation of a two-way radio system on a single channel, wherein the receiving station can break in on the transmitting station so that the operation is generally equivalent to full duplex operation. This permits a conservation of radio channels which is extremely important. Also the system of the invention does not require the use of a diplexer for connecting the transmitter and receiver at each station to a single antenna. This results in a substantial saving in space as the control circuit required in the system of the invention can be provided by integrated circuit logic devices which require very small space. This is particularly important in portable units wherein diplexers of constructions now known would not be suitable for use because of their size. The saving in cost resulting from the elimination of the diplexer also compensates for the cost of the control circuit, and the overall cost of the radio system may be less than systems which provide full duplex operation.

I claim:

1. A control system for two-way apparatus having a transmitter and receiver both operable at a predetermined frequency, and an antenna suitable for transmitting to or receiving, at said frequency, remote transmitter and receiver apparatus which includes a similar control system, such control system including in combination:

means for actuating the system to the transmit mode including means for activating the transmitter and means coupling the transmitter to the antenna, means operable in the transmit mode to periodically deactivate the transmitter and couple the receiver to the antenna for brief sampling intervals, means for detecting the presence of a transmitted signal by said remote transmitter at the predetermined frequency during the sampling intervals, latching means inhibiting transmission in response to a detected signal and locking the system to the receive mode, means operable to override the latching means for continued operation in the transmit mode, blanking means for muting the audio output of the receiver, and means for detecting the sampling period of said remotely located transmitter and, in response thereto, causing the blanking means to mute the audio output of the receiver during each sampling period.

2. The system of claim 1 further comprising shaping means for predeterminedly controlling the rate of turn-on and turn-off of the transmitter during sampling intervals whereby adjacent channel splatter is reduced.

3. The system of claim 1 wherein the latching means comprises bistable circuitry which operably switches the system to the receive mode in response to a detected signal and which may be reset to the transmit mode in response to an override signal.

4. A control system for two-way radio apparatus including a radio transmitter adapted to be actuated to produce a carrier wave of a predetermined frequency, a radio receiver adapted to receive a carrier wave of the predetermined frequency and including means for reproducing a received signal, and an antenna and switch means selectively connecting the transmitter and the receiver to the antenna, such control system including in combination:

timer means producing a timing interval including a first timer device for providing a relatively long time period coupled to a second adjustable timer device for producing a relatively short time period, generator means coupled to said timer means for producing a pulse of a given duration following each time interval, and means coupling said generator means to said timer means for actuating said timer means at the end of said pulse produced by said generator means, control means including a transmit switch connected to the transmitter for actuating the same, said control means being connected to the switch means for operating the same to connect the transmitter to the antenna and being connected to said timer means for actuating the same, said control means being coupled to said generator means and responsive to said pulse therefrom to disable the transmitter and operate the switch means to connect the receiver to the antenna, and detector means coupled to the receiver and responsive to a received signal, said detector means being coupled to said control means and causing said control means to hold the transmitter disabled and to hold the switch means operated to connect the receiver to the antenna during the presence of a received signal.

5. The control system in accordance with claim 4 wherein said means coupling said generator means to said timer means for actuating said timer means at the end of said pulse produced by said generator means is coupled to said transmit switch and rendered operative thereby.

6. A control system in accordance with claim 4 including means coupling said transmit switch to said second timer device for adjusting the time interval produced thereby in response to the operation of said transmit switch.

7. A control system in accordance with claim 4 wherein when the transmit switch is not actuating the transmitter said detector means is coupled to said timer means and is operative at the end of a received signal to initiate operation of said timer means, and wherein said generator means is coupled to the means for reproducing a received signal for blanking the same during the pulses produced by said generator means.

8. A control system in accordance with claim 7 wherein said control means is coupled to said timer means and to said generator means and controls the time interval produced by said timer means and the time duration of each pulse produced by said generator means in accordance with the operation of said transmit switch.

9. A control system in accordance with claim 4 wherein said first timer portion includes clock means, counter means connected to said clock means, and a bistable circuit coupled to said counter means for controlling the same.

10. A control system in accordance with claim 9 including first differentiating circuit means coupling said transmit key to said bistable circuit for actuating said bistable circuit to initiate operation of said counter means, and second differentiating circuit means coupling the output of said counter means to said bistable circuit for operating the same to reset said counter means.

11. A control circuit in accordance with claim 10 wherein said first differentiating circuit means includes a portion coupled to said generator means for actuating said bistable circuit to render said counter means operative at the end of said pulse produced by said generator means.

12. A control circuit in accordance with claim 10 wherein said first differentiating circuit means includes a portion coupled to said detector means for actuating said bistable circuit to render said counter means operative in response to a signal produced by the radio receiver.

* * * * *